United States Patent
Xu et al.

(10) Patent No.: US 12,031,953 B2
(45) Date of Patent: Jul. 9, 2024

(54) DEEPWATER PLATFORM WELDED JOINT TESTING SYSTEM

(71) Applicant: TIANJIN UNIVERSITY, Tianjin (CN)

(72) Inventors: Lianyong Xu, Tianjin (CN); Lei Zhao, Tianjin (CN); Yongdian Han, Tianjin (CN); Chao Feng, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 286 days.

(21) Appl. No.: 17/716,217

(22) Filed: Apr. 8, 2022

(65) Prior Publication Data
US 2023/0324268 A1 Oct. 12, 2023

(51) Int. Cl.
  *G01N 3/20* (2006.01)
  *B63B 79/30* (2020.01)

(52) U.S. Cl.
  CPC ........... *G01N 3/20* (2013.01); *B63B 79/30* (2020.01); *G01N 2203/0017* (2013.01); *G01N 2203/0019* (2013.01); *G01N 2203/0252* (2013.01); *G01N 2203/0254* (2013.01); *G01N 2203/0296* (2013.01)

(58) Field of Classification Search
  CPC ............ G01N 3/20; G01N 2203/0296; G01N 2203/0019; G01N 2203/0252; G01N 2203/0017; G01N 2203/0254; B63B 79/30; G01M 5/005; G01M 99/007
  See application file for complete search history.

(56) References Cited

U.S. PATENT DOCUMENTS

| 7,204,160 B1 * | 4/2007 | Sadegh ................. G01N 3/10 73/862.041 |
| 10,809,169 B2 * | 10/2020 | Ma .......................... G01N 3/32 |

FOREIGN PATENT DOCUMENTS

| CN | 108132190 A | * | 6/2018 | ........... G01B 11/162 |
| CN | 110044722 A | * | 7/2019 | |
| CN | 210893503 U | * | 6/2020 | |
| CN | 113433008 A | * | 9/2021 | |

* cited by examiner

*Primary Examiner* — Jonathan M Dunlap
(74) *Attorney, Agent, or Firm* — Hawaii Patent Services; Nathaniel K. Fedde; Kenton N. Fedde

(57) ABSTRACT

Disclosed is a deepwater platform welded joint testing system. The testing system comprises a host unit, a hydraulic unit and a control unit, wherein the control unit is connected with the host unit and the hydraulic unit respectively; the host unit comprises a bearing frame placed on a bearing base, biaxial tension/compression loading oil cylinders mounted on the bearing frame, a lateral force resistant mechanism connected to the front ends of the biaxial tension/compression loading oil cylinders, counter-force supports fixed to the top end of the bearing frame and biaxial bending loading oil cylinders mounted on the counter-force supports. According to the deepwater platform welded joint testing system, through the independent or synergistic effect of the six loading oil cylinders, stretching and fatigue performance tests of a large complex structure under uniaxial tension/compression, uniaxial bending, biaxial tension/compression, biaxial bending and uniaxial/biaxial tension/compression and bending composite loads can be achieved.

7 Claims, 1 Drawing Sheet

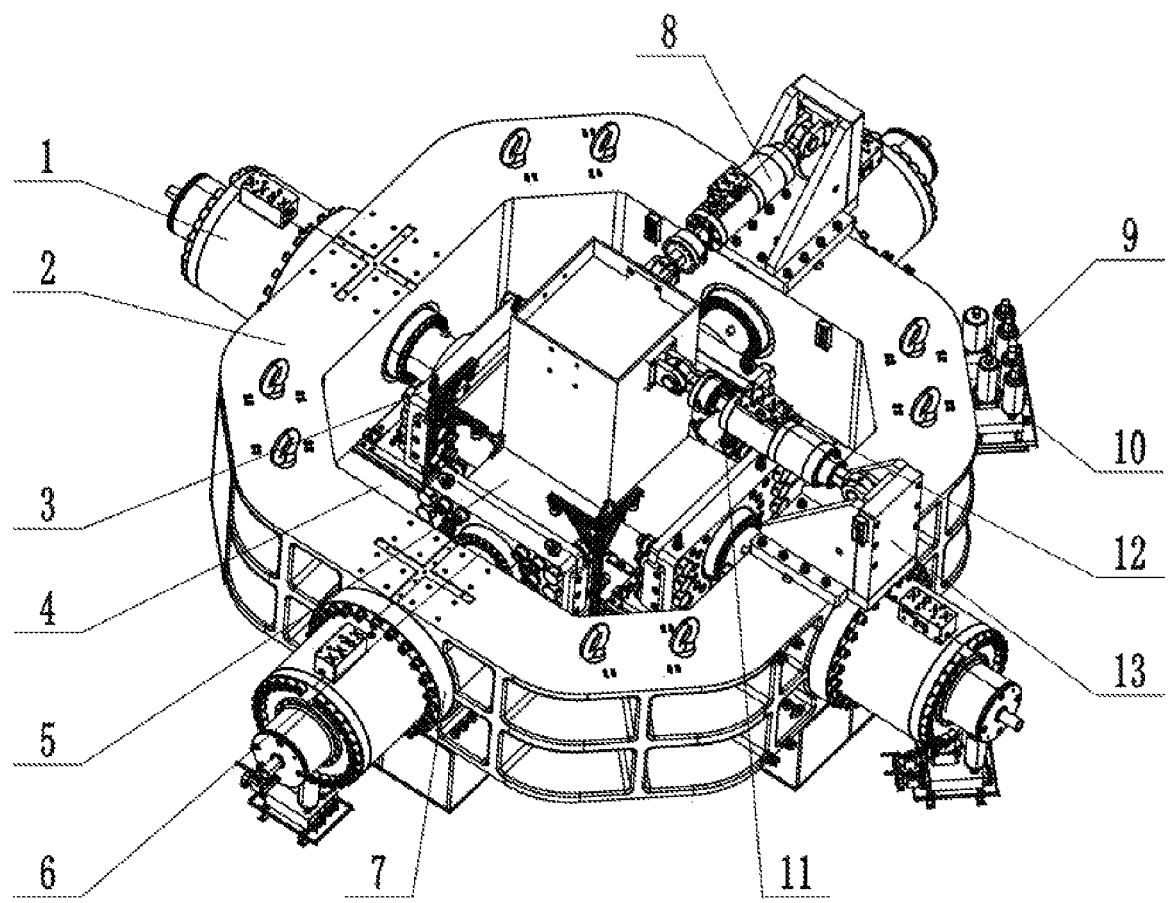

DEEPWATER PLATFORM WELDED JOINT TESTING SYSTEM

TECHNICAL FIELD

The present disclosure relates to the technical field of loading tests, in particular to a deepwater platform welded joint testing system.

BACKGROUND ART

With the rapid development of current social economy, the demand for fossil energy such as petroleum and natural gas is higher and higher in current social progress and economic development. The ocean, as the area with the most abundant fossil energy reserves, is crucial for reasonable and effective development of the ocean. Due to the harsh conditions of offshore operation, the usability and reliability of a large deepwater platform and key components of the large deepwater platform have significant influence on the manufacturing and use of the large deepwater platform. Researches on the fatigue performance of key welding joints and large complex welding structures of the deepwater platform are helpful for performing reasonable fatigue design on key fatigue dangerous parts of the large deepwater platform, so that accidents such as structural failure are avoided, and reasonable and efficient development of ocean resources is guaranteed.

Because the key welded joint parts of the large deepwater platform are large in sizes and complex in loads, a scientific and practical testing system needs to be built to reasonably analyze the complex stress condition of the large deepwater platform, and effective and accurate test data are obtained, so that reasonable fatigue design is carried out on the key welded joints, and then further development of a deepwater platform manufacturing technology and a scientific theory is promoted. Aiming at the requirements of modern manufacturing industry on the use performance of the deepwater platform and the key welded joints of the deepwater platform, a traditional fatigue testing machine is difficult to synchronously realize accurate tests with large sizes and complex loads.

SUMMARY

For this purpose, the present disclosure provides a deepwater platform welded joint testing system. The system can realize accurate tests of large-size and complex loads.

In order to achieve the purpose, the present disclosure provides the following scheme:

Firstly, the load application form of the actual working condition of a large complex structure is comprehensively considered, aiming at the load characteristics of the large complex structure, four groups of biaxial tension/compression loading oil cylinders which are symmetrically distributed in a crossed manner are arranged, and the application of uniaxial tension/compression or biaxial tension/compression loads is realized by virtue of the independent or cooperative working capacity of the four groups of biaxial tension/compression loading oil cylinders.

Secondly, two groups of mutually perpendicular bending loading counter-force supports in directions are respectively arranged above the bearing frame, two groups of biaxial bending loading oil cylinders are correspondingly mounted, the two groups of biaxial bending loading oil cylinders have independent or cooperative working capacity, and uniaxial bending or biaxial bending loads are applied by applying bending moment to the testing specimen; and moreover, the biaxial bending loading oil cylinders can adjust the application direction of the bending moment, and the application of bending moment in different directions within 360 degrees is achieved.

Thirdly, the four groups of biaxial tension/compression loading oil cylinders and the two groups of biaxial bending loading oil cylinders in the second step and the third step can work independently or cooperatively, and uniaxial bending and stretching composite or biaxial tension/compression bending composite loads are applied through independent or cooperative work.

Fourthly, a fatigue testing specimen of a large complex structure is large in size, large in test force and complex in structure, so that the relative positions of the bending loading counter-force supports and the fatigue testing specimen and the relation between the bending moment and the load of the bending loading device are fully considered in order to ensure the safety test of the fatigue testing specimen of a large complex structure; and firm connection between the testing specimen and each loading oil cylinder is realized through flanges, so that accidental fracture at the connecting position is avoided, and the test is prevented from being interfered.

Fifthly, multiple factors such as the size of the fatigue testing specimen, the oil cylinder loading mode and the stress concentration level of the frame structure are fully considered, it is guaranteed that the action center point is not changed, the safety performance is guaranteed so that reliable test data can be obtained, and the fatigue testing specimen of a large complex structure is connected with all the loading oil cylinders through positioning pins to achieve high-precision mounting; and errors caused by non-coaxial stress of the fatigue testing specimen are avoided, and a guide rail and an elevator are mounted on the testing system to realize rapid and convenient mounting of the fatigue testing specimen of a large complex structure.

A deepwater platform welded joint testing system comprises:

a host unit, a hydraulic unit and a control unit, wherein the control unit is connected with the host unit and the hydraulic unit respectively;

the host unit comprises a horizontal octagonal bearing frame placed on a bearing base, a crossed symmetrical base mounted on the bearing frame, four groups of biaxial tension/compression loading oil cylinders mounted on the bearing frame in a crossed symmetrical manner, biaxial tension/compression loading oil cylinder flanges connected to the front ends of the biaxial tension/compression loading oil cylinders respectively, a lateral force resistant mechanism connected to the biaxial tension/compression loading oil cylinders, a force sensor connected to the lateral force resistant mechanism, two groups of mutually perpendicular bending loading counter-force supports fixed to the top end of the bearing frame, two groups of biaxial bending loading oil cylinders mounted on the bending loading counter-force supports, a fatigue testing specimen flange welded to four axes of the fatigue testing specimen of a large complex structure and a fatigue testing specimen vertical plate flange mounted on a vertical plate of the fatigue testing specimen.

Optionally, considering the condition of large test force born by the fatigue testing specimen of a large complex structure, the bending loading counter-force support is formed by combined welding processing, each mounting surface is finely processed, and key grooves are formed in the bottom of the bending loading counter-force support and are used for bearing lateral shear loads. At least nine small holes are coaxially formed in the crossed symmetrical base and the bearing frame to realize firm connection through bolts, and at least nine small holes are coaxially formed in the vertical plate and the front ends of the biaxial bending loading oil cylinders to realize firm connection with the flanges through bolts.

Optionally, a turbine elevator is mounted at the upper parts of the bending loading counter-force supports.

Optionally, the lateral force resistant mechanism comprises a bearing support connected to the front ends of the biaxial tension/compression loading oil cylinders, a rolling row mounted on the bearing support and a mounting plate mounted on the rolling row.

Optionally, a linear guide rail is mounted on the upper part of the crossed symmetrical base and used for conveying and mounting the fatigue testing specimen of a large complex structure and bearing lateral shear loads, so that the test precision is guaranteed.

Optionally, the biaxial tension/compression loading oil cylinders and the biaxial bending loading oil cylinders can work independently or cooperatively, and uniaxial tension/compression, uniaxial bending, biaxial tension/compression and uniaxial/axial tension/compression and bending composite loads is achieved.

Optionally, the number of the biaxial tension/compression loading oil cylinders is four, and the number of the biaxial bending loading oil cylinders is two.

Optionally, the biaxial bending loading oil cylinders can adjust the application direction of the bending moment, and the application of the bending moment in different directions within 360 degrees is achieved.

Optionally, flange plates are mounted at the front ends of the biaxial tension/compression loading oil cylinders, the four axes of the fatigue testing specimen of a large complex structure, the front ends of the biaxial bending loading oil cylinders and the positions, corresponding to the biaxial bending loading oil cylinders, of the vertical plate of the fatigue testing specimen respectively and are subjected to cold machining treatment, firm connection between the fatigue testing specimen and a fatigue performance testing system is achieved, and fatigue failure at the connecting position is avoided.

Optionally, the hydraulic unit comprises a force sensor, a servo valve connected to the force sensor, a servo actuator connected to the servo valve, and a magnetostrictive displacement sensor coaxially mounted with a servo oil cylinder.

Optionally, the hydraulic unit further comprises an oil tank, a double-flow assembly type plate heat exchanger connected with the oil tank, a substation connected with the servo actuator, a filter and an air filter, and the filter and the air filter are arranged above the oil tank.

Optionally, the control unit comprises four cameras, an LED screen, an industrial computer and a data acquisition card which are connected in sequence, and the four cameras are arranged on four axes of the host.

Optionally, the control unit adopts an electro-hydraulic servo control technology to carry out whole-course closed-loop control, the control unit realizes the loading modes of equal-load loading, load maintaining, displacement equal-rate loading and displacement maintaining through selection of force control and displacement control functions, and smooth switching of all control modes and control rates can be realized in the test process.

Optionally, the testing system is of a horizontal structure.

According to at least one technical scheme adopted by embodiments of the present specification, the following beneficial effects can be achieved:

As a dynamic test device, the testing system has a function of guaranteeing that the center point is not changed during biaxial displacement control loading, and has a phase-adjustable loading function. The test force can be simultaneously loaded to peak and valley values so as to meet the stretching and fatigue tests of testing specimens of different complex welding structures under the action of uniaxial tension/compression, uniaxial bending, biaxial tension/compression, biaxial bending and uniaxial/biaxial tension/compression and bending composite loads. The testing system has the characteristics of simple operation, high reliability, high safety coefficient, high response speed, high control precision and the like.

According to the testing system, stretching and fatigue tests of a testing specimen of a large complex welding structure under the action of uniaxial tension/compression, uniaxial bending, biaxial tension/compression, biaxial bending and uniaxial/biaxial tension/compression and bending composite loads can be carried out, so that guidance is provided for reasonable fatigue design of the welding structure.

BRIEF DESCRIPTION OF THE DRAWINGS

Attached FIGURES, which form a part of the specification and are provided for further understanding of the present disclosure, show the preferred embodiments of the present disclosure, and explain the principle of the present disclosure together with the description, but not by way of limitation with regard to the claimed disclosure. In the attached FIGURE, FIG. 1 is a three-dimensional schematic diagram of a large deepwater platform welded joint composite loading testing system provided by the embodiment of the present disclosure.

Reference signs: 1, biaxial tension/compression loading oil cylinder; 2, bearing frame; 3, fatigue testing specimen flange; 4, crossed symmetrical base; 5, fatigue testing specimen of large complex structure; 6, force sensor; 7, biaxial tension/compression loading oil cylinder flange; 8, biaxial bending loading oil cylinder; 9, tension/compression loading oil cylinder oil source substation; 10, bending loading oil cylinder oil source substation; 11, fatigue testing specimen guide rail; 12, fatigue testing specimen vertical plate flange; and 13, bending loading counter-force support.

DETAILED DESCRIPTION OF THE EMBODIMENTS

To make objectives, technical solutions, and advantages of the present disclosure clearer, the following describes the technical schemes in the present disclosure with reference to the specific embodiments of the present disclosure and the corresponding attached FIGURE. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Based on the limitation of an existing fatigue testing system in the aspects of size and load loading, the present disclosure provides a multi-axis loading testing system of complex structure welded joints of a large deepwater platform under the action of various loads. The system can be used for carrying out stretching and fatigue tests on the testing specimen of a large complex welding structure under the action of uniaxial tension/compression, uniaxial bending, biaxial tension/compression, biaxial bending and uniaxial/biaxial tension/compression and bending composite loads, and then provides guidance for reasonable fatigue design of the welding structure.

The present disclosure provides a large complex structure multi-axis loading structure level fatigue testing specimen testing system, which can realize stretching and fatigue tests under various loads, and provides important theoretical and engineering foundations for reasonable fatigue design in the manufacturing process by reasonably simulating complex service environments of a deepwater platform and key welded joints of the deepwater platform.

A tension/compression bending composite fatigue testing system for a large complex structure is provided.

The load application form of the actual working condition of a large complex structure is comprehensively considered, aiming at the load characteristics of the large complex structure, four groups of biaxial tension/compression loading oil cylinders which are symmetrically distributed in a crossed manner are arranged, and the application of uniaxial tension/compression or biaxial tension/compression loads is realized by virtue of the independent or cooperative working capacity of the four groups of biaxial tension/compression loading oil cylinders.

Two groups of mutually perpendicular bending loading counter-force supports in directions are respectively arranged above the bearing frame, two groups of biaxial bending loading oil cylinders are correspondingly mounted, the two groups of biaxial bending loading oil cylinders have independent or cooperative working capacity, and uniaxial bending or biaxial bending loads are applied by applying bending moment to the testing specimen; and moreover, the biaxial bending loading oil cylinders can adjust the application direction of the bending moment, and the application of bending moment in different directions within 360 degrees is achieved.

The four groups of biaxial tension/compression loading oil cylinders and the two groups of biaxial bending loading oil cylinders can work independently or cooperatively, and uniaxial bending and stretching composite or biaxial tension/compression bending composite loads are applied.

A fatigue testing specimen of a large complex structure is large in size, large in test force and complex in structure, so that the relative positions of the bending loading counter-force supports and the fatigue testing specimen and the relation between the bending moment and the load of the bending loading device are fully considered in order to ensure the safety test of the fatigue testing specimen of a large complex structure; and firm connection between the testing specimen and each loading oil cylinder is realized through flanges, so that accidental fracture at the connecting position is avoided, and the test is prevented from being interfered.

Multiple factors such as the size of the fatigue testing specimen, the oil cylinder loading mode and the stress concentration level of the frame structure are fully considered, it is guaranteed that the action center point is not changed, the safety performance is guaranteed so that reliable test data can be obtained, and the fatigue testing specimen of a large complex structure is connected with all the loading oil cylinders through positioning pins to achieve high-precision mounting; and errors caused by non-coaxial stress of the fatigue testing specimen are avoided, and a guide rail and an elevator are mounted on the testing system to realize rapid and convenient mounting of the fatigue testing specimen of a large complex structure.

As shown in FIG. 1, a tension/compression bending composite fatigue testing system for a large complex structure comprises:

a host unit, a hydraulic unit and a control unit, wherein the control unit is connected with the host unit and the hydraulic unit respectively.

The host unit comprises an octagonal bearing frame 2, a crossed symmetrical base 4 mounted on the bearing frame 2, four groups of biaxial tension/compression loading oil cylinders 1 mounted on the bearing frame in a crossed symmetrical manner, biaxial tension/compression loading oil cylinder flanges 7 connected to the front ends of the biaxial tension/compression loading oil cylinders 1 respectively, a lateral force resistant mechanism connected to the biaxial tension/compression loading oil cylinders 7, a force sensor 6 connected to the lateral force resistant mechanism, two groups of mutually perpendicular bending loading counter-force supports 13 fixed to the top end of the bearing frame 2, two groups of biaxial bending loading oil cylinders 8 mounted on the bending loading counter-force supports 13, a fatigue testing specimen flange 3 welded to four axes of the fatigue testing specimen 5 of a large complex structure and a fatigue testing specimen vertical plate flange 12 mounted on a vertical plate of the fatigue testing specimen 5.

Further, considering the condition of large test force born by the fatigue testing specimen of a large complex structure, the bending loading counter-force support 13 is formed by combined welding processing, each mounting surface is finely processed, and key grooves are formed in the bottom of the bending loading counter-force support and are used for bearing lateral shear loads. At least nine small holes are coaxially formed in the crossed symmetrical base 4 and the bearing frame 2 to realize firm connection through bolts, and at least nine small holes are coaxially formed in the vertical plate and the front ends of the biaxial bending loading oil cylinders 8 to realize firm connection with the flanges through bolts.

Further, a turbine elevator is mounted at the upper parts of the bending loading counter-force supports 13 for mounting the fatigue testing specimen of a large complex structure.

Further, a linear guide rail as a fatigue testing specimen guide rail 11 is mounted on the upper part of the crossed symmetrical base 4 and used for conveying and mounting the fatigue testing specimen of a large complex structure and bearing lateral shear loads, so that the test precision is guaranteed.

Further, the lateral force resistant mechanism comprises a bearing support connected to the front ends of the biaxial tension/compression loading oil cylinders 1, a rolling row mounted on the bearing support and a mounting plate mounted on the rolling row.

Further, the biaxial tension/compression loading oil cylinders 1 and the biaxial bending loading oil cylinders 8 can work independently or cooperatively, the test force can synchronously reach peak values, and uniaxial tension/compression, uniaxial bending, biaxial tension/compression, biaxial bending and uniaxial/axial tension/compression and bending composite loads is achieved.

Further, flange plates are mounted at the front ends of the biaxial tension/compression loading oil cylinders 1, the four axes of the fatigue testing specimen 5 of a large complex structure and the positions, corresponding to the biaxial bending loading oil cylinders 8, of the vertical plate of the fatigue testing specimen respectively and are subjected to cold machining treatment, firm connection between the fatigue testing specimen 5 and a fatigue performance testing system is achieved, and fatigue failure at the connecting position is avoided.

Further, the biaxial bending loading oil cylinders 8 can adjust the application direction of the bending moment through the bending loading counter-force supports 13, and the application of the bending moment in different directions within 360 degrees is achieved.

The hydraulic unit comprises a force sensor 6, a servo valve connected to the force sensor 6, a servo actuator connected to the servo valve, and a magnetostrictive displacement sensor coaxially mounted with a servo oil cylinder.

The hydraulic unit further comprises an oil tank, a double-flow assembly type plate heat exchanger connected with the oil tank, a tension/compression loading oil cylinder oil source substation 9, a bending loading oil cylinder oil source substation 10, a filter and an air filter, the tension/compression loading oil cylinder oil source substation 9 and the bending loading oil cylinder oil source substation 10 are connected with the servo actuator, and the filter and the air filter are arranged above the oil tank.

The control unit comprises four cameras, an LED screen, an industrial computer and a data acquisition card which are connected in sequence, and the four cameras are arranged on four axes of the host.

Wherein, the control unit adopts an electro-hydraulic servo control technology to carry out whole-course closed-loop control, the control unit realizes the loading modes of equal-load loading, load maintaining, displacement equal-rate loading and displacement maintaining through selection of test force control and displacement control functions, and smooth switching of all control modes and control rates can be realized in the test process. The control unit can realize data acquisition automation and data display, processing and printing functions, and is embedded with limit protection and over-limit alarm functions, so that equipment and personal safety in the test process is guaranteed, and unattended operation in the test process can be realized.

Further, under the cooperation of all parts of the testing system, by combining the independent or synergistic effect of four groups of biaxial tension/compression loading oil cylinders 1 and two groups of biaxial bending loading oil cylinders 8, accurate simulation of actual working conditions of the large complex structure can be ensured under the uniaxial tension/compression, uniaxial bending, biaxial tension/compression, biaxial bending and uniaxial/axial tension/compression and bending composite loading conditions.

As a dynamic test device, the testing system has a function of guaranteeing that the center point is not changed during biaxial displacement control loading, and has a phase-adjustable loading function. The test force can be simultaneously loaded to peak and valley values so as to meet the stretching and fatigue tests of testing specimens of different complex welding structures under the action of uniaxial tension/compression, uniaxial bending, biaxial tension/compression, biaxial bending and uniaxial/biaxial tension/compression and bending composite loads. The control unit can realize data acquisition automation and data display, processing and printing functions, and is embedded with limit protection and over-limit alarm functions, so that equipment and personal safety in the test process is guaranteed, and unattended operation in the test process can be realized. The testing system has the characteristics of simple operation, high reliability, high safety coefficient, high response speed, high control precision and the like.

The testing system can serve for stretching and fatigue performance analysis of a large deepwater platform welded joint complex structure. Through comparative analysis of fatigue performance in design curve standards, the applicability of the fatigue design curve selected by deepwater platform key welded joints under the combined load working condition is verified. S-N curve testing and S-N design curve verification analysis of a structural level fatigue testing specimen of a large welding structure can be carried out under the action of uniaxial tension/compression, uniaxial bending, biaxial tension/compression, biaxial bending and uniaxial/biaxial tension/compression and bending composite loads. In addition, the testing system has good expansibility, can adapt to fatigue performance tests of different structures such as complex pipe joints and anchor chain structures in the future, has wide application prospects and economic benefits, and provides an important theoretical basis for fatigue performance evaluation of ocean engineering materials.

Moreover, the terms "include", "comprise", or their any other variants are intended to cover a non-exclusive inclusion, so that equipment including a series of elements not only includes those elements but also includes other elements that are not expressly listed, or further includes elements inherent to the equipment. An element preceded by "includes a . . . " does not, without more constraints, preclude the presence of additional identical elements in the equipment that includes the element.

The foregoing descriptions are merely embodiments of the present disclosure, but are not intended to limit the present disclosure, and for the skill in the art, the present disclosure can be of various modifications and changes. Any modification, equivalent replacement, or improvement made without departing from the spirit and principle of the present disclosure shall fall within the claim scope of the present disclosure.

What is claimed is:
1. A deepwater platform welded joint testing system, comprising:
 a host unit, a hydraulic unit and a control unit, wherein the control unit is connected with the host unit and the hydraulic unit respectively;
 the host unit comprises a bearing frame placed on a bearing base, biaxial tension/compression loading oil cylinders mounted on the bearing frame, a lateral force resistant mechanism connected to the front ends of the biaxial tension/compression loading oil cylinders, counter-force supports fixed to the top end of the bearing frame and biaxial bending loading oil cylinders mounted on the counter-force supports;
 the lateral force resistant mechanism comprises a bearing support connected to the front ends of the biaxial tension/compression loading oil cylinders, a rolling row mounted on the bearing support and a mounting plate mounted on the rolling row;
 the biaxial tension/compression loading oil cylinders are four biaxial oil cylinders, are vertically arranged, and have multi-axial tension/compression loading capacities such as uniaxial tension/compression and biaxial tension/compression;
 the biaxial bending loading oil cylinders are two biaxial oil cylinders, are vertically arranged, and have multi-axial bending loading capacities such as uniaxial bending and biaxial bending; and the biaxial tension/compression loading oil cylinders and the biaxial bending loading oil cylinders have a combined capacity, and the system has a uniaxial/biaxial tension/compression and bending composite loading capacity.

2. The testing system according to claim 1, wherein a turbine elevator is mounted at the upper parts of the counter-force supports.

3. The testing system according to claim 1, wherein the hydraulic unit comprises a force sensor, a servo valve connected to the force sensor, a servo actuator connected to the servo valve, and a magnetostrictive displacement sensor coaxially mounted with a servo oil cylinder.

4. The testing system according to claim 3, wherein the hydraulic unit further comprises an oil tank, a double-flow assembly type plate heat exchanger connected with the oil tank, a substation connected with the servo actuator, a filter and an air filter, and the filter and the air filter are arranged above the oil tank.

5. The testing system according to claim 1, wherein the control unit comprises four cameras, an LED screen, an industrial computer and a data acquisition card which are connected in sequence, and the four cameras are arranged on four axes of the host.

6. The testing system according to claim 1, wherein the control unit adopts an electro-hydraulic servo control technology to carry out whole-course closed-loop control, the control unit realizes the loading modes of equal-load loading, load maintaining, displacement equal-rate loading and displacement maintaining through selection of force control and displacement control functions, and smooth switching of all control modes and control rates can be realized in the test process.

7. The testing system according to claim 1, wherein the testing system is of a horizontal structure.

\* \* \* \* \*